(12) United States Patent
Filippi et al.

(10) Patent No.: US 7,444,859 B2
(45) Date of Patent: Nov. 4, 2008

(54) WHEEL ASSEMBLY WITH INTERNAL PRESSURE RESERVOIR AND PRESSURE FLUCTUATION WARNING SYSTEM

(75) Inventors: Massimo Filippi, Milan (IT); Renato Caretta, Milan (IT)

(73) Assignee: Pirelli Tyre S.p.A., Milan (IT)

( * ) Notice: Subject to any disclaimer, the term of this patent is extended or adjusted under 35 U.S.C. 154(b) by 53 days.

(21) Appl. No.: 11/662,287

(22) PCT Filed: Jul. 19, 2005

(86) PCT No.: PCT/EP2005/007841
§ 371 (c)(1),
(2), (4) Date: Mar. 9, 2007

(87) PCT Pub. No.: WO2006/027044
PCT Pub. Date: Mar. 16, 2006

(65) Prior Publication Data
US 2008/0093814 A1    Apr. 24, 2008

(30) Foreign Application Priority Data
Sep. 9, 2004  (WO) ............... PCT/IB2004/002928

(51) Int. Cl.
*G01M 17/02* (2006.01)
(52) U.S. Cl. .............. 73/146; 73/146.2; 73/146.3; 73/146.4; 340/442
(58) Field of Classification Search ........ 73/146–146.8; 340/442–447
See application file for complete search history.

(56) References Cited

U.S. PATENT DOCUMENTS

| | | | |
|---|---|---|---|
| 4,067,376 A | 1/1978 | Barabino | |
| 5,263,524 A * | 11/1993 | Boardman | 152/416 |
| 5,895,846 A | 4/1999 | Chamussy et al. | |
| 6,591,671 B2 * | 7/2003 | Brown | 73/146.5 |
| 6,748,799 B2 * | 6/2004 | Fischer et al. | 73/146.5 |
| 6,943,673 B2 * | 9/2005 | Skoff et al. | 340/442 |
| 7,273,082 B2 * | 9/2007 | White et al. | 152/417 |
| 2002/0104374 A1 | 8/2002 | Merendino, Sr. | |
| 2005/0081973 A1 | 4/2005 | Marin-Martinod | |

FOREIGN PATENT DOCUMENTS

| | | |
|---|---|---|
| EP | 1 319 530 | 6/2003 |
| FR | 2 822 414 | 9/2002 |
| WO | WO 03/057515 | 7/2003 |

* cited by examiner

*Primary Examiner*—Andre J. Allen
*Assistant Examiner*—Jermaine Jenkins
(74) *Attorney, Agent, or Firm*—Finnegan, Henderson, Farabow, Garrett & Dunner, L.L.P.

(57) ABSTRACT

Method of allowing control of a vehicle provided with at least two wheels in case of puncture of a tire, each wheel having a rim and a tire associated therewith, including the steps of inflating each tire to an operating pressure at a reference temperature; admitting a fluid compressed to a first pressure higher than the operating pressure of the tire at the reference temperature into at least one tank associated with at least one of the rims; bringing the tire into communication with the tank when the inner pressure of the tire is lower than the operating pressure by a predetermined first threshold value; measuring the inner pressure of the tire with a predetermined frequency; calculating a variation of the inner pressure in the time unit; generating an alarm signal when the variation of the inner pressure corresponds to a reduction and is higher than a predetermined value; and transmitting the alarm signal to the driver.

56 Claims, 4 Drawing Sheets

WHEEL ASSEMBLY WITH INTERNAL PRESSURE RESERVOIR AND PRESSURE FLUCTUATION WARNING SYSTEM

CROSS REFERENCE TO RELATED APPLICATIONS

This application is a national phase application based on PCT/EP2005/007841, filed Jul. 19, 2005, and claims the priority of PCT/IB2004/002928, filed Sep. 9, 2004, the content of both of which is incorporated herein by reference.

BACKGROUND OF THE INVENTION

1. Field of the Invention

The present invention relates to a method for allowing a control of a vehicle provided with at least two wheels in case of puncture of a tyre.

2. Description of the Related Art

A wheel for a two- or four-wheeled vehicle generally comprises a rim coupled with a tyre that is inflated to a given operating pressure.

Said tyre generally comprises a carcass structure having at least one carcass ply and at least one annular reinforcing structure associated with the carcass ply, a tread band of elastomer material applied to the carcass structure at a radially external position, a belt structure interposed between the carcass structure and the tread band and a pair of sidewalls at axially opposite positions on the carcass structure.

In tubeless tyres, the tyre airtightness is ensured by the radially internal layer of said carcass structure generally referred to as "liner". In use, due to the natural air leakage through said liner (which in any case is never perfectly impervious to air), pressure within the tyre decreases so that the vehicle's driver is forced to carry out a periodical restoration of said pressure.

In an attempt to make the tyre pressure substantially constant over a rather long period of time, use of rims internally housing a tank containing a fluid under pressure (such as air, nitrogen or other substantially inert gases) has been suggested, in which tank there is a pressure higher than the operating pressure of the tyre. By means of one or more valves suitably operated, the required pressure is restored when needed.

U.S. Pat. No. 4,067,376 shows an alarm system connected with the pressure in a tyre which comprises a pressure-sensitive device susceptible of being mounted to the wheel and suitable to emit sonic or ultrasonic signals each time the inner pressure of the tyre exceeds a maximum value or is lower than a minimum value. Also shown is a system for automatically reintroducing the air lost by a tyre while a vehicle is running, to minimise the effects of a burst. Manufacture of the wheel involves the presence of an integrated annular bag suitable to store an amount of compressed air under high pressure. A safety pressure valve is placed between said bag and the tyre and is adapted to release air from the bag to the tyre each time pressure in the tyre goes down below a predetermined limit.

The Applicant realised that known devices, those of the previously illustrated type for example, do not allow the driver to be warned about a possible puncture in due time so as to enable him/her to stop the vehicle without consequences for the driver himself/herself and the passengers, if any. More specifically, said devices do not ensure a sufficient margin of safety enabling the vehicle to be stopped before the latter becomes uncontrollable due to a sudden lowering of the inner pressure in the tyre.

In particular, it is the Applicant's perception that a margin of safety can be conveniently obtained not only when the inner pressure of the punctured tyre is maintained to a value sufficient to enable running of the tyre for a suitable period of time, due to a quick admission of air into the tyre itself, but also when the driver is rapidly made acquainted with a danger situation.

In a two-wheeled vehicle this aspect is of vital importance for the rider's safety because due to the particular dynamics of this vehicle, the rider can become acquainted with such a situation too late.

In fact, in comparison with tyres for four-wheeled vehicles, quite particular performances involving many structural differences are required from tyres for two-wheeled vehicles. The most important differences originate from the fact that during running on a bend a motorcycle must remarkably tilt with respect to the position during a straight run, forming an angle (called camber angle) with the perpendicular to the ground that can reach 45° and, under extreme drive conditions, 65°.

Therefore, when a motorcycle faces a bend, the ground-contact area of the tyre progressively moves from the central region of the tread towards the axially outermost region in the direction of the bend centre. For this reason tyres for two-wheeled vehicles are distinguishable for their marked transverse curvature. This transverse curvature is usually defined by the particular value of the ratio of the distance between the radially outer point of the tread and the line passing through the laterally opposite extremities of the tread itself measured on the equatorial plane of the tyre, to the distance measured along the tyre chord between said extremities. In tyres for two-wheeled vehicles, the value of the curvature ratio is generally not lower than 0.15 and is normally in the order of about 0.3 for rear tyres, but also higher, until about 0.45, for front tyres, against a value usually in the order of about 0.05 in tyres for motor-vehicles.

The foregoing being stated, it is to be pointed out that the effects of a quick deflation of the tyres in two-wheeled medium-powered or high-powered vehicles, and in particular in maxi-scooters of the new generation, are very dangerous in terms of incidence on the loss of control of the vehicle, irrespective of the running speed.

More specifically, in case of deflation of the rear tyre a very quick starting of oscillations in the rear axle occurs, which oscillations are amplified until the vehicle becomes uncontrollable. In the case of a full-load configuration and with a passenger the tyre unbeading can occur, which has important consequences for the rider and the passenger.

These effects can be more easily detected on two-wheeled vehicles such as maxi-scooters, due to the strong load on the rear axle connected with positioning of the propeller. For this type of vehicles the danger level is still higher when the engine is of the balancing type and is therefore an integral part of the suspension, because this gives rise to a high value of the oscillating unsprung mass.

When deflation of a front tyre occurs, in addition to the above described effects there are also depreciatory effects on the drive features, since driving becomes harder and this difficulty suddenly appears on a bend when there is a resistance to a variation of the camber angle which will bring about the very dangerous effect of occupying the opposite ride lane.

Although in a car the effects of a quick deflation of a tyre are not as critical as in the case of a two-wheeled vehicle, they are however very dangerous both for the vehicle that, due to an "out-of-control", can be seriously damaged, and for the driver and the passengers that, even though well protected by the vehicle bodywork and the modern safety systems (such as pre-tensioning of the belts, airbags, bars against intrusion on the structure), are in any case exposed to injuries and lesions that can also be very serious depending on the impact velocity.

SUMMARY OF THE INVENTION

In the Applicant's opinion, only a timely alarm informing of a puncture in progress can help the driver to adopt the necessary measures for speed reduction in a well-timed manner before the pressure values reach a threshold making them uncontrollable. In addition, for the purpose, it is the Applicant's perception that the capability of quickly restoring a sufficient pressure at the inside of a punctured tyre allows the phase of instability of the vehicle before full stopping of same to be avoided.

Therefore, the Applicant has found that it is possible to ensure a safe stopping of the vehicle in case of puncture of a tyre by arranging a system for pressure recovery on the wheel and supplying the driver with an alarm signal informing of the puncture in progress, through measurement of the pressure variation internally of the tyre in the time unit.

Consequently the timely warning sent and the simultaneous fluid flow towards the tyre for pressure restoration enable the above mentioned margin of safety to be achieved, because the vehicle keeps stable and drivable at least for the period of time necessary for carrying out stopping of same.

In a first aspect the invention relates to a method of allowing a control on a vehicle with at least two-wheels in case of puncture of a tyre, each wheel comprising a rim and a tyre associated therewith, said method comprising the steps of:
  inflating each tyre to an operating pressure;
  admitting a compressed fluid having a first pressure higher than the operating pressure of the tyre into at least one tank associated with at least one of said rims;
  bringing said tyre into communication with said tank when the inner pressure of said tyre is lower than a predetermined first threshold value;
  measuring the inner pressure of said tyre with a predetermined frequency;
  calculating a variation in said inner pressure in the time unit;
  generating an alarm signal when said inner-pressure variation corresponds to a reduction and is higher than a predetermined value;
  transmitting said alarm signal to the driver.

In a preferred embodiment of said method, said vehicle is a two-wheeled vehicle and said rim associated with said tank belongs to the front wheel.

In another preferred embodiment, said vehicle is a two-wheeled vehicle and said rim associated with said tank belongs to the rear wheel.

In a different embodiment, said method comprises the step of interrupting said communication between said tyre and tank when the inner pressure of said tyre is substantially the same as said operating pressure.

In another embodiment, said method comprises the step of generating an alarm signal when the pressure of the fluid contained in said tank is lower than a predetermined second threshold value.

In another aspect, the invention relates to a vehicle having at least two wheels, comprising:
  at least one rim with which a tank adapted to be filled with a fluid to a first pressure is operatively associated;
  a tyre mounted on said rim and inflated to an operating pressure, said operating pressure being lower than said first pressure;
  at least one valve adapted to regulate a communication between said tank and tyre so as to bring said tank and tyre into mutual communication when the inner pressure of said tyre is lower than a predetermined first threshold value;
  at least one sensor operatively associated with said wheel to measure the inner pressure of said tyre with a predetermined frequency;
  at least one calculation unit to calculate a variation in said inner pressure in the time unit;
  at least one signal generator operatively associated with said calculation unit and capable of generating an alarm signal when said pressure variation corresponds to a reduction and is higher than a predetermined value.

In a preferred embodiment of said vehicle, said tank is integrated into said rim.

In a different preferred embodiment said tank is operatively associated with a pressure sensor to measure the pressure of said fluid contained in said tank.

In another embodiment, said pressure sensor is operatively associated with said signal generator to generate an alarm signal when the pressure of the fluid contained in the tank is under a predetermined second threshold value.

In a different embodiment, said valve is a solenoid valve.

In a preferred embodiment, said pressure sensor measuring the inner pressure of the tyre controls said communication between said tank and tyre by said solenoid valve.

In a further embodiment, said solenoid valve is operatively associated with said signal generator to bring said tyre into communication with said tank, when the inner-pressure variation corresponds to a reduction and is higher than a predetermined value.

In a different embodiment of the vehicle in accordance with the invention, a temperature sensor is provided which is operatively associated with said wheel to measure the inner temperature of the tyre.

In another embodiment, said temperature sensor is operatively associated with said calculation unit to calculate, for each inner pressure measured according to said predetermined frequency at the inner temperature of the tyre, the pressure corresponding to a reference temperature (TR).

In further aspect, the invention relates to a wheel comprising:
  at least one rim with which a tank adapted to be filled with a fluid to a first pressure is operatively associated;
  a tyre mounted on said rim and inflated to an operating pressure, said operating pressure being lower than said first pressure;
  at least one valve adapted to regulate a communication between said tank and tyre so as to bring said tank and tyre into mutual communication when the inner pressure of said tyre is lower than a predetermined first threshold value;
  at least one pressure sensor to measure the inner pressure of said tyre with a predetermined frequency;
  said pressure sensor being operatively associable with a calculation unit calculating a variation in said inner pressure in the time unit.

It is necessary to point out that, to the aims of the present invention, each comparison between different pressure values (the pressure of the fluid in the tank and the inner pressure of the tyre, for example) is referred to the same reference temperature TR so as to make the comparison uniform, should pressures be measured at different temperatures.

BRIEF DESCRIPTION OF THE DRAWINGS

Further features and advantages of the invention will become more apparent from the detailed description of some preferred, but not exclusive, embodiments of a method of allowing a control on a vehicle having at least two wheels in case of puncture of a tyre and of a vehicle to which said method can apply.

This description will be set out hereinafter with reference to the accompanying drawings, given by way of non-limiting example, in which.

DETAILED DESCRIPTION OF THE INVENTION

Figure 1:
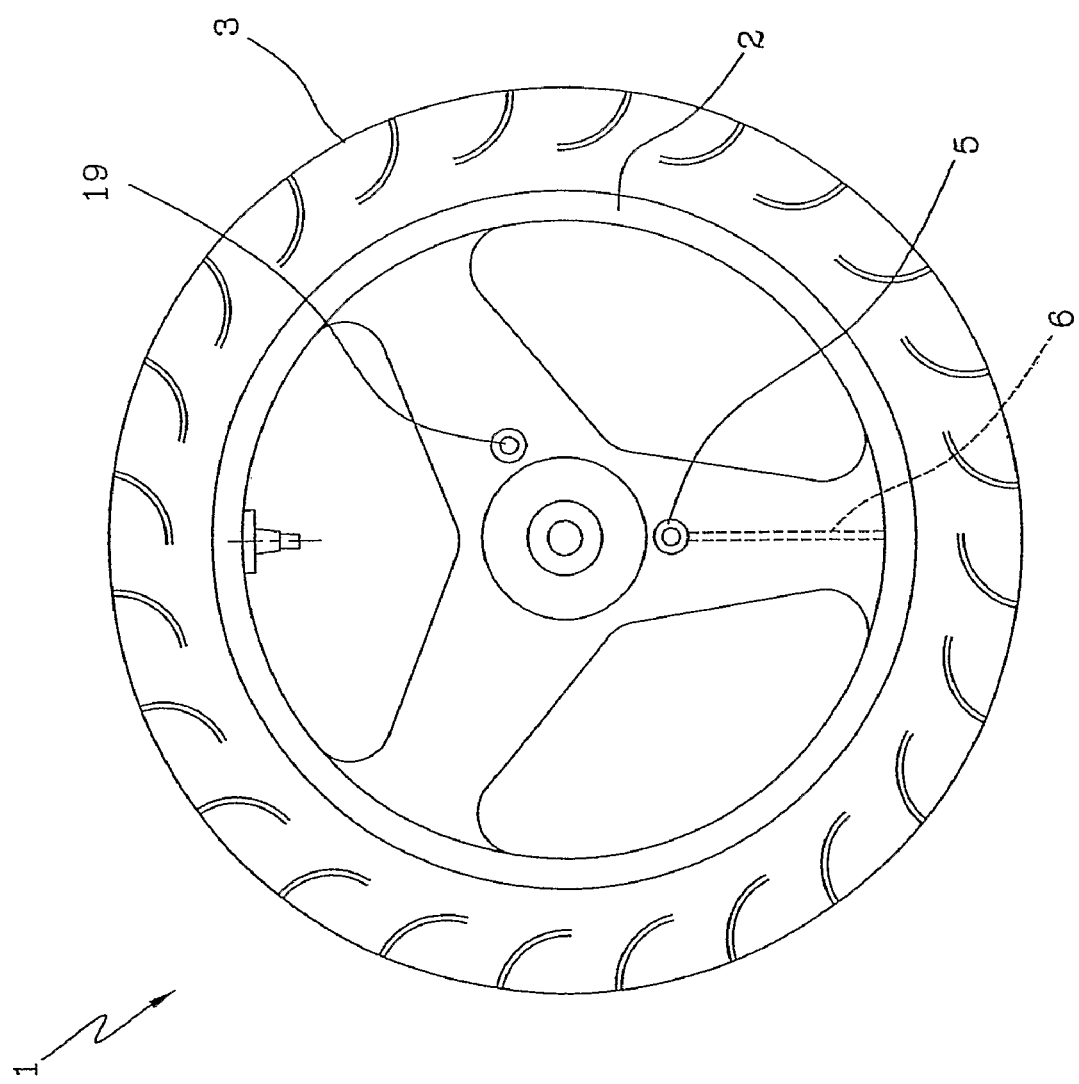
FIG. 1 is a vertical view of a wheel of a two-wheeled vehicle in accordance with the invention.
Figure 2:
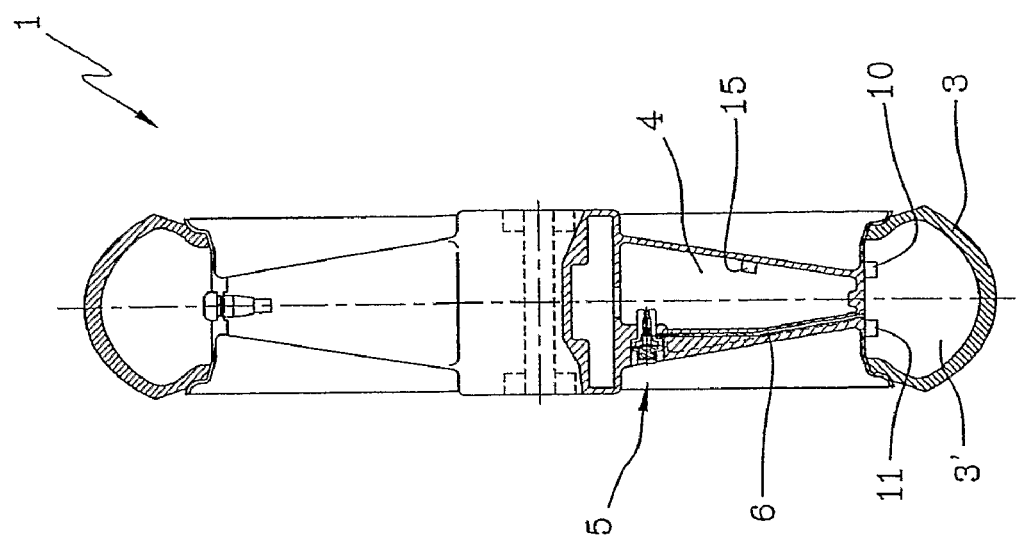
FIG. 2 is a side view partly in section of the wheel shown in FIG. 1.
Figure 4:
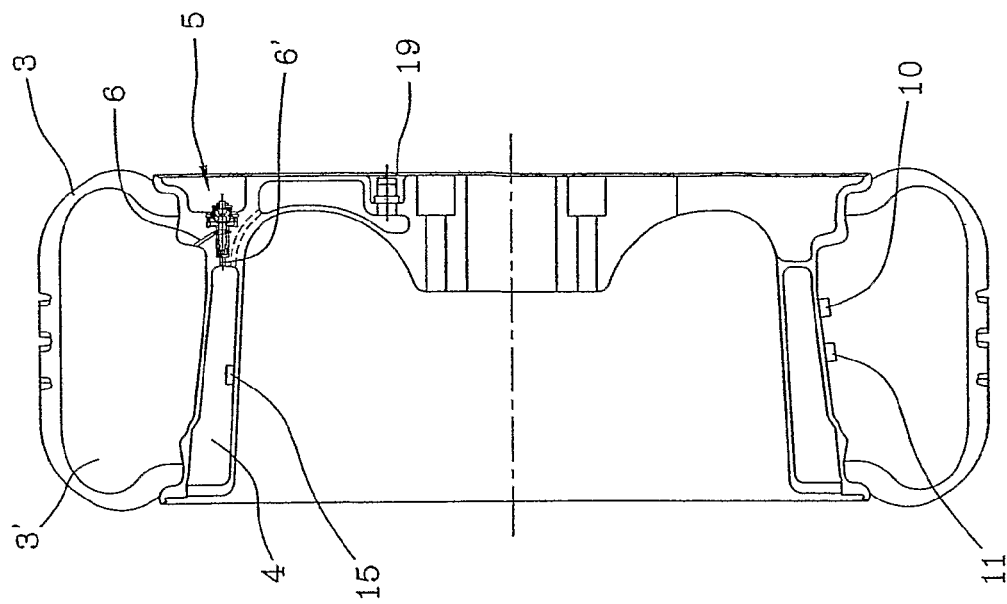
FIG. 4 is a side view partly in section of the wheel shown in FIG. 3.
Figure 3:
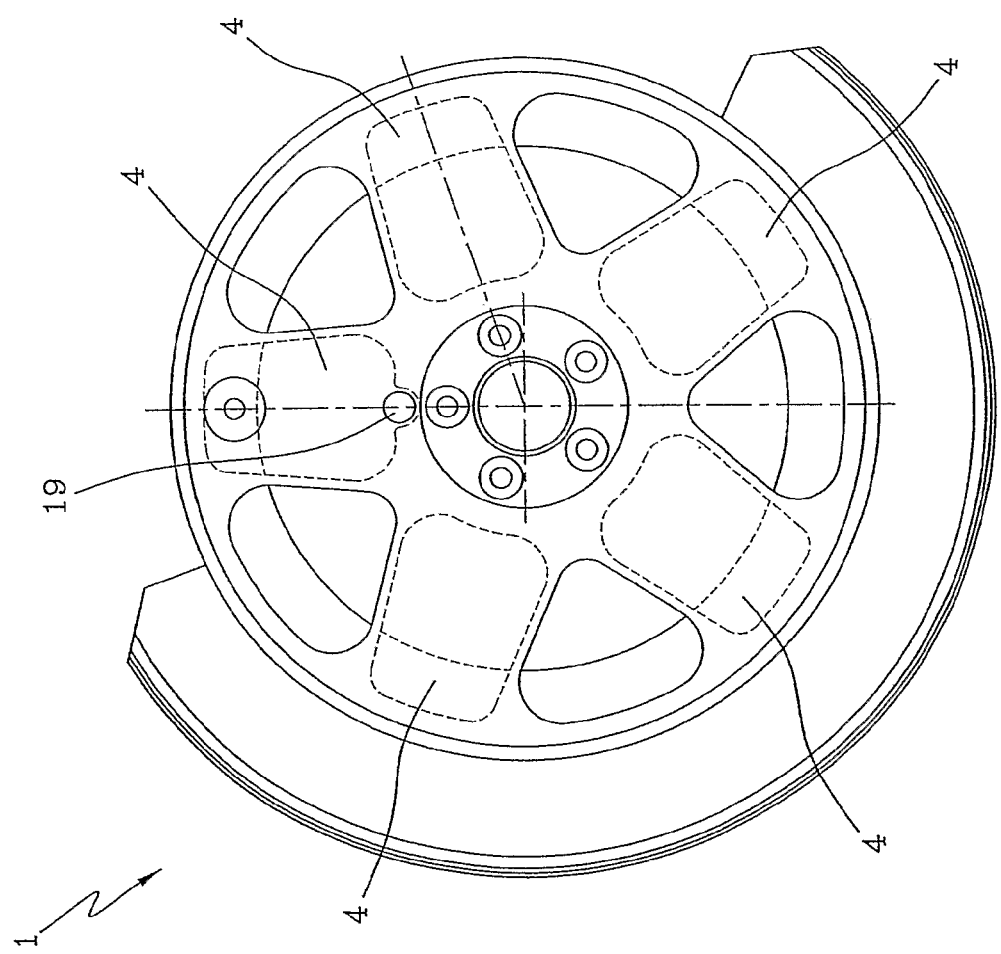
FIG. 3 is a partial vertical view of a wheel of a four-wheeled vehicle in accordance with the invention.

As shown in FIGS. 1, 2, 3 and 4, at least one wheel 1 (FIGS. 1, 2) for a two-wheeled vehicle in accordance with the invention and preferably at least one pair of driving wheels 1 for a four-wheeled vehicle (FIGS. 3, 4) in accordance with the invention, comprise a rim 2 on which a tyre 3 of an inner volume 3' is mounted. Associated with said rim 2 and preferably integrated thereinto is a tank 4 suitable to hold a fluid under pressure, said fluid being air or a substantially inert gas such as nitrogen, for example.

According to a preferred embodiment, the ratio between the operating pressure PE of the tyre 3 and a first pressure PP existing in said full-load tank 4 varies between about 0.1 and about 0.6, preferably between about 0.2 and about 0.4.

According to a further preferred embodiment, the ratio between the volume of said tank 4 and said inner volume 3' of the tyre is included between about 0.1 and about 0.4, preferably between about 0.12 and about 0.3.

The rim 2 preferably houses a valve 5 preferably at a radially inner position not far from the rotation centre of the wheel, which valve enables communication between the tank 4 and the inner volume 3' of the tyre 3 to be regulated.

Said communication can be obtained for example by providing the rim 2 with an internal duct 6 for connecting said valve 5 to the inner volume of said tyre 3, said valve 5 further providing a direct connection (FIG. 2) or a connection through another duct 6' (FIG. 4) with said tank 4.

Said valve 5 can be of the mechanical type or can be a solenoid valve fed from a power source present on the wheel or coming from the vehicle.

Also provided in wheel 1 is the presence of a pressure sensor 10 housed on the rim 2 or internally of the tyre 3, said pressure sensor 10 being operatively associated or associable with a calculation unit (not shown) preferably placed on the vehicle and capable of calculating pressure variations in the time unit.

Advantageously, in a preferred embodiment of the invention, calculation of said pressure variations is carried out with temperature compensation of same. More specifically, since the pressure of a gas is substantially proportional to the absolute temperature, a temperature variation causes a pressure variation that is not due to gas leaks or admissions from and to the tyre. Said compensation preferably takes place in the following way: the calculation unit receives an information concerning pressure from the pressure sensor 10 and an information concerning temperature from a temperature sensor 11 (which is disposed on rim 2 or internally of tyre 3 as well, said temperature sensor 11 being operatively associated with said calculation unit); through subsequent application of the gas laws, the calculation unit draws the pressure value at said reference temperature TR. Then, calculated on these compensated pressure values are said pressure variations in the time unit, as shown in the following.

According to a further preferred embodiment, the pressure sensor 10 and temperature sensor 11 are integrated with each other.

In addition, in a different embodiment of the invention, the calculation unit is not on the vehicle, but is integrated with the pressure sensor 10.

The pressure sensor 10 carries out pressure measurement within the volume 3' of tyre 3 with a predetermined frequency F, this frequency being preferably included between about 0.05 Hz and about 50 Hz, and more preferably between about 0.1 Hz and 10 Hz, the Applicant considering the last-mentioned range a good compromise between the necessity to acquired data at the highest possible frequency and with a reduced energy consumption by the pressure sensor 10.

Said calculation unit, knowing the acquisition frequency F of the datum concerning the inner pressure Pi of tyre 3 and receiving from the pressure sensor 10 the subsequent values Pi found at the different instants n and n+1, calculates the pressure variation Vp in the time unit in the manner hereinafter illustrated:

$$Vp = [(Pi)_{n+1} - (Pi)_n] \times F$$

In accordance with the invention, operatively associated with the calculation unit is a signal generator of the acoustic, electronic, lighted, digital or any other type capable of generating a signal at the moment the value of Vp is negative (i.e. there is a reduction in pressure Pi in the time unit), and overcomes a predetermined threshold value Vp* in absolute value.

Preferably said predetermined threshold value Vp* is included between about 0.005 bar/s and about 0.1 bar/s, and more preferably this value is included between about 0.01 bar/s and about 0.05 bar/s.

After the above statements, it is to be pointed out that valve 5 follows a relatively simple operation scheme. When the inner pressure Pi of tyre 3 is lower than a predetermined first threshold value Vs*, valve 5, if it is of the mechanical type, is calibrated in such a manner as to enable a fluid flow from tank 4 to the inner volume 3' until said value Vs* is overcome again by the inner pressure Pi. If valve 5 is a solenoid valve, the pressure sensor 10 or the signal generator associated with said pressure sensor 10 through the calculation unit, can send an opening signal and a possible closing signal depending on variations of Pi with respect to Vs* in the same manner as above illustrated.

Preferably said first threshold value Vs* is included between about 0.8 PE and about 0.95 PE.

In case of puncture, the value Vs* is likely to be no longer overcome by Pi because the fluid (air, for example) admitted from tank 4 is ultimately released to the outside, whereas in case of natural leakage of the fluid from the radially inner layer of tyre 3 the fluid flow from tank 4 is able to restore pressure PE thereby causing closure of valve 5.

In addition, if a solenoid valve is used as the valve 5, operation of same, as previously illustrated, will not be independent of the pressure sensor 10 as in the case of use of a mechanical valve, but will be actively determined by the detections carried out by said pressure sensor 10, through a signal generated by the sensor itself or through the signal generator.

In an alternative embodiment, said solenoid valve can be operated so as to be opened not only when Pi is lower than the first threshold value Vs* as above illustrated, but also by a signal sent by said signal generator when Vp corresponds to a reduction and exceeds the predetermined value Vp*.

In an alternative solution of the invention, tank 4 internally comprises a second pressure sensor 15 operatively associated or associable with said signal generator so as to generate a signal when pressure Ps of the fluid contained in tank 4 decreases under a second predetermined threshold value Vs**, said value being preferably included between about 1.5 PE and about 2.5 PE.

The signal generator, in a further preferred embodiment of the invention, is operatively associated with a transmission system (not shown) preferably arranged onboard of the vehicle, which is capable of transmitting said signals to the driver's position, preferably by a pilot light associated with an acoustic signal.

The method in accordance with the invention is preferably put into practice with the following modalities. First by a normal compressor for example, fluid, preferably air, is admitted into tank 4 through an inflating valve 19 to a given room temperature, of 15, 20, 25° C. or another value for example, that will correspond to said reference temperature TR.

Tyre 3 is first flat and therefore valve 5 connects tank 4 to the inner volume 3' of tyre 3. When pressure within the tyre reaches the prescribed operating pressure PE, valve 5 reaches its closed position preventing passage of air under pressure between tank 4 and the inner volume 3' of said tyre 3. Tank 4 is then charged to said first pressure PP, generally included between about 8 and about 12 bars, more preferably between about 8.5 and about 10 bars.

During operation of the vehicle on which wheels 1 in accordance with the invention are mounted, small air leakages occur that are due to a non-perfect imperviousness of the liner of the carcass structure of the tyre for example, or a non-perfect adhesion between the tyre bead and the rim flange on which the bead rests, which leakages can be quantified in about 0.1 bar/month. When the inner pressure Pi of tyre 3 decreases and the first threshold value Vs* is reached, valve 5 opens due to its calibration if it is of the mechanical type or to a signal sent by the pressure sensor 10 or said signal generator if valve 5 is a solenoid valve, until pressure Pi reaches the PE value again.

In this case the first threshold value Vs* enables opening of valve 5 only after the Pi value has reached at least Vs*, i.e. a value included between about 0.8 PE and about 0.95 PE. In this manner steadiness to the wheel assembly is ensured since small recharges in case of minimum pressure losses are avoided.

When tyre 3 is punctured, the Pi value reaches Vs* quickly and as above illustrated valve 5 opens and generates a continuous air flow into tyre 3.

In addition, when a puncture occurs, the Pi value varies rather quickly in time at least until opening of said valve 5. Consequently the Pi variation in the time unit calculated as above illustrated by the calculation unit can overcome the limit of Vp* and in this case the signal generator is activated. Said signal generator generates a signal that is transmitted as an alarm signal to the vehicle's driver preferably in the form of a combination of a signal light on the dashboard and an acoustic signal.

The driver of a two-wheeled or four-wheeled vehicle being promptly warned, he/she begins slowing down until the vehicle stops while the fluid flow is moving from tank 4 to the inside of the punctured tyre 3 thereby enabling vehicle braking and stopping in a very safe manner, the vehicle instability being avoided.

EXAMPLES

Figure 5:
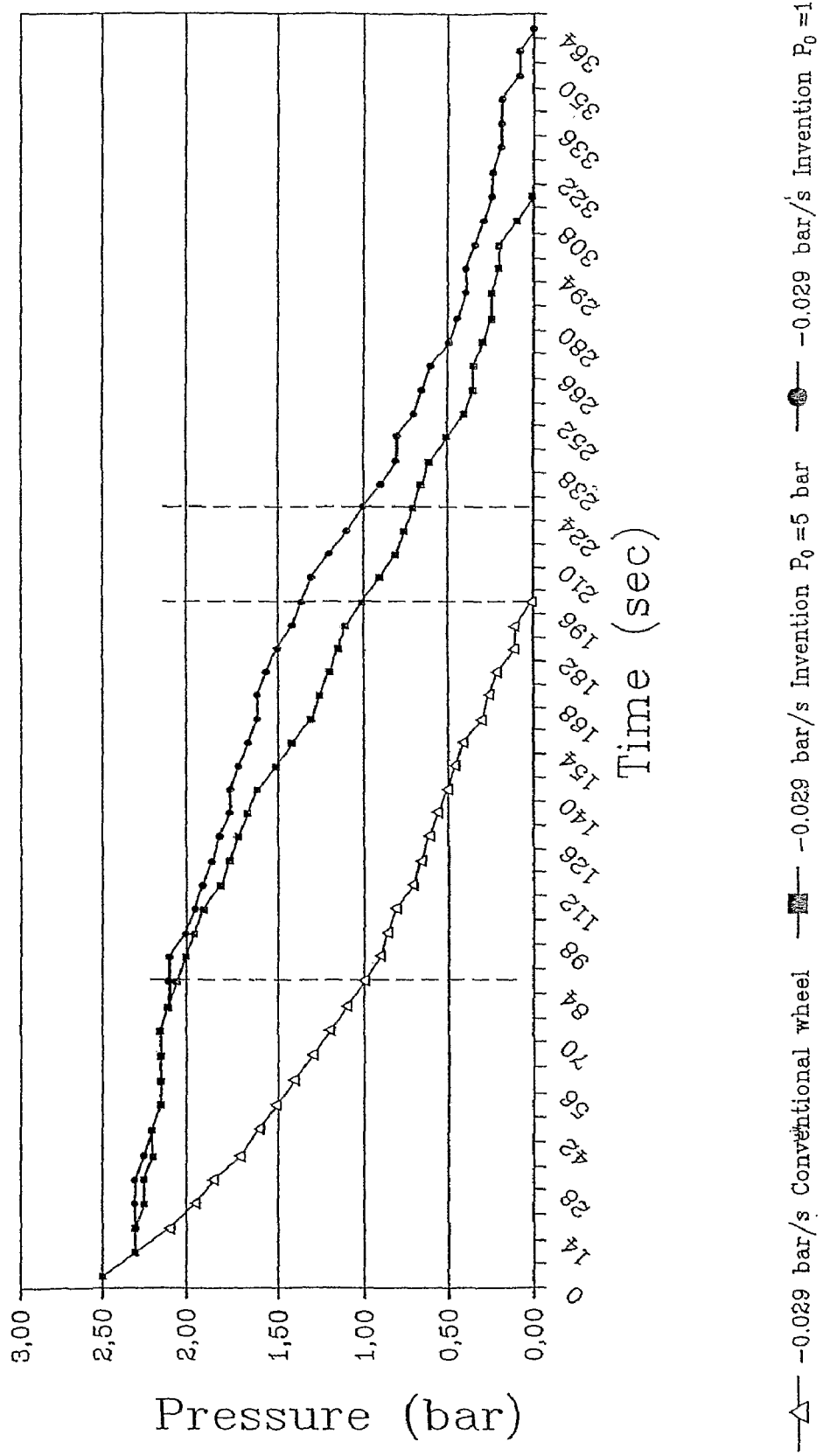
FIG. 5 represents a graph showing the pressure variation in time in case of puncture of a wheel of a two-wheeled vehicle in accordance with the invention and in a wheel of a two-wheeled vehicle of known type.

The results of puncture tests carried out on a front wheel of a two-wheeled vehicle in accordance with the invention and on a front wheel of a two-wheeled vehicle of the conventional type are reproduced in FIG. 5 in a diagram time (x axis)/pressure (y axis); (the wheel of said conventional type being devoid of tank 4 and valve 5 and only having a normal inflation/restoration valve inserted in the tyre). Both wheels have the respective inner volumes of the tyre equal to 0.009 m$^3$ and a starting pressure of 2.5 bars. It is possible to see that when a puncture causing a starting loss of pressure equal to about 0.029 bar/second is simulated, in the wheel belonging to the vehicle of the invention that is equipped with a tank having a volume of 0.0025 m$^3$ at a starting pressure of about 10 and 5 bars, after about 1 minute and 25 seconds, a residual pressure of about 2.15 and 2.1 bars is respectively found, while in the wheel belonging to a conventional vehicle there is a pressure of only about 1 bar. After about 205 seconds the residual pressure of the wheel belonging to the vehicle in accordance with the invention is still of about 1.35 and 1 bar respectively, whereas the pressure in the wheel of a conventional vehicle has gone to zero (gauge pressures).

Figure 6:
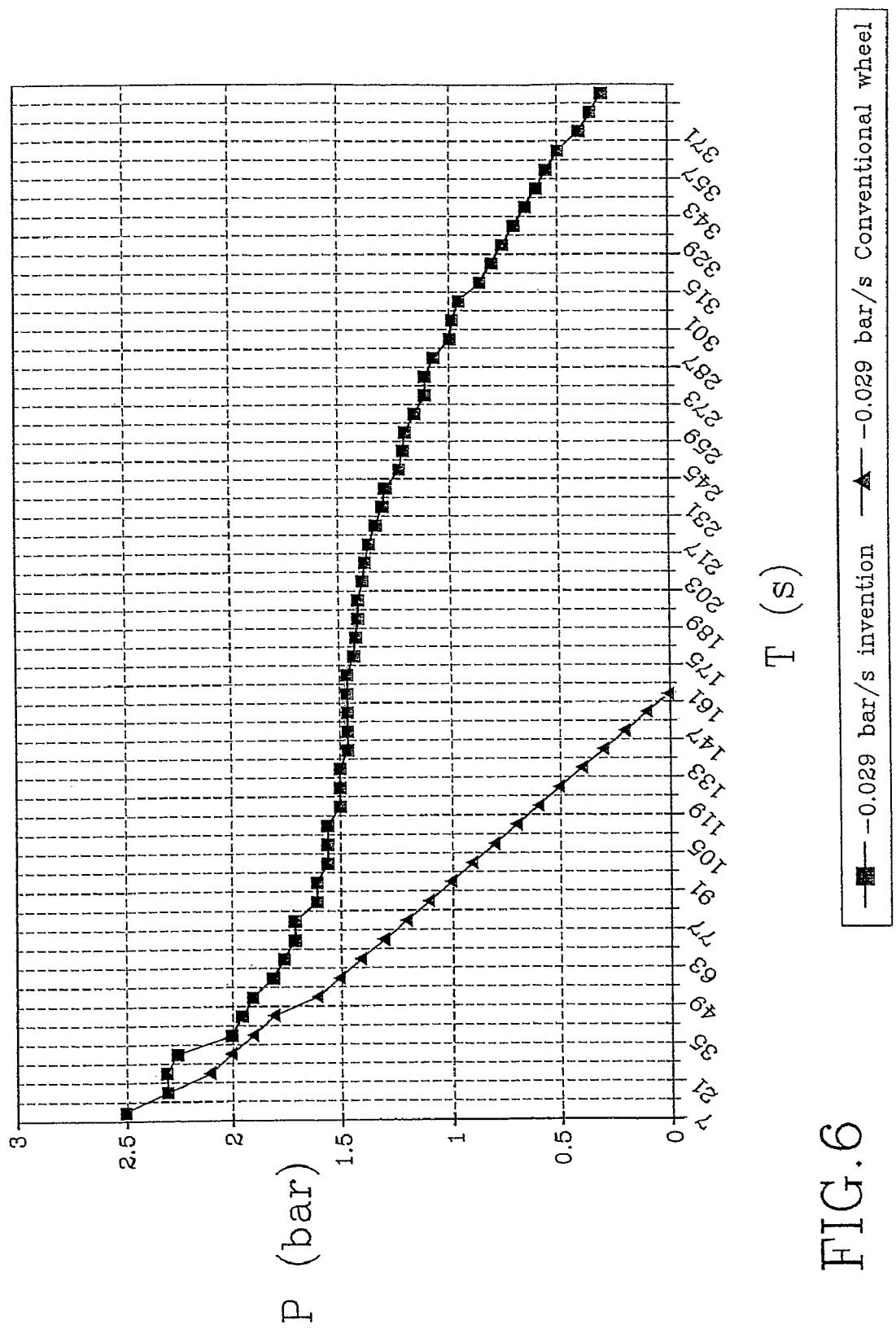
FIG. 6 is a graph showing the pressure variation in time in case of puncture of a wheel of a four-wheeled vehicle in accordance with the invention and in a wheel of a four-wheeled vehicle of known type.

The results of puncture tests carried out on a wheel of a four-wheeled vehicle in accordance with the invention and on a wheel of a four-wheeled vehicle of the conventional type are reproduced in FIG. 6 in a diagram time (x axis)/pressure (y axis); (the wheel of said conventional type being devoid of tank 4 and valve 5 and only having a normal inflation/restoration valve inserted in the tyre). Both wheels have the respective inner volumes of the tyre equal to 0.06 m$^3$ and a starting pressure of 2.5 bars. It is possible to see that when a puncture causing a starting loss of pressure equal to about 0.029 bar/second is simulated, in the wheel belonging to the vehicle of the invention (equipped with a tank having a volume of 0.009 m$^3$ at a starting pressure of about 9 bars) after about 2 minutes a residual pressure of about 1.5 bars is found, while in the wheel belonging to a conventional vehicle there is a pressure of only about 0.65 bar. After about 165 seconds the residual pressure of the wheel in accordance with the invention is still of about 1.45 bar, whereas the pressure in the wheel of a conventional vehicle has gone to zero (gauge pressures).

As above stated, it can be easily understood that due to this gradual pressure lowering the driver is able to stop the vehicle in a very safe manner and to always have the vehicle control.

It will be finally recognised that in the above described tests use of a tank 4 charged to 5 bars simulates the pressure of tank 4 after about six months of use if charged to 10 bars at the beginning. As previously illustrated, in fact, tyre 3 is submitted to an air leak of about 0.1 bar/month, which leak is restored, as above illustrated, by the charge present in tank 4.

The invention claimed is:

1. A method of allowing control of a vehicle with at least two wheels in case of puncture of a tyre, each wheel comprising a rim and a tyre associated therewith, comprising the steps of:
   inflating each tyre to an operating pressure;
   admitting a fluid compressed to a first pressure higher than the operating pressure of said tyre into at least one tank associated with at least one of said rims;
   bringing said tyre into communication with said tank when inner pressure of said tyre is lower than a predetermined first threshold value;
   measuring the inner pressure of said tyre with a predetermined frequency;
   calculating a variation in said inner pressure in a time unit;
   generating an alarm signal when inner pressure variation corresponds to a reduction and is higher than a predetermined value; and
   transmitting said alarm signal to a driver.

2. The method as claimed in claim 1, wherein said tank is integrated into said rim.

3. The method as claimed in claim 1, wherein said vehicle is a two-wheeled vehicle and said rim associated with said tank belongs to a front wheel.

4. The method as claimed in claim 1, wherein said vehicle is a two-wheeled vehicle and said rim associated with said tank belongs to a rear wheel.

5. The method as claimed in claim 1, comprising the step of interrupting said communication between said tyre and tank when the inner pressure of said tyre is substantially the same as said operating pressure.

6. The method as claimed in claim 1, wherein said predetermined frequency is about 0.05 Hz to about 50 Hz.

7. The method as claimed in claim 6, wherein said predetermined frequency is about 0.1 Hz to about 10 Hz.

8. The method as claimed in claim 1, wherein said predetermined value of the variation of the inner pressure in the time unit is about 0.005 bar to about 0.1 bar.

9. The method as claimed in claim 8, wherein said predetermined value of the variation of the inner pressure in the time unit is about 0.01 bar to about 0.05 bar.

10. The method as claimed in claim 1, wherein said predetermined first threshold value is about 0.8 PE to about 0.95 PE.

11. The method as claimed in claim 1, comprising the step of generating an alarm signal when the pressure of the fluid contained in said tank is lower than a predetermined second threshold value.

12. The method as claimed in claim 11, wherein said second threshold value is about 1.5 PE to about 2.5 PE.

13. The method as claimed in claim 11, wherein said signal is transmitted to a driver.

14. The method as claimed in claim 1, comprising the step of measuring inner temperature of said tyre.

15. The method as claimed in claim 14, comprising the step of calculating, for each inner pressure measured according to said predetermined frequency at the inner temperature of the tyre, the pressure corresponding to a reference temperature.

16. The method as claimed in claim 1, comprising the step of bringing said tyre into communication with said tank when the variation of the inner pressure corresponds to a reduction and is higher than a predetermined value.

17. A vehicle having at least two wheels, comprising:
   at least one rim with which a tank adapted to be filled with a fluid to a first pressure is operatively associated;
   a tyre mounted on said rim and inflated to an operating pressure, said operating pressure being lower than said first pressure;
   at least one valve adapted to regulate communication between said tank and tyre so as to bring said tank and tyre into mutual communication when inner pressure of said tyre is lower than a predetermined first threshold value;
   at least one pressure sensor operatively associated with said wheel to measure the inner pressure of said tyre with a predetermined frequency;
   at least one calculation unit to calculate a variation in said inner pressure in a time unit; and
   at least one signal generator operatively associated with said calculation unit and capable of generating an alarm signal when pressure variation corresponds to a reduction and is higher than a predetermined value.

18. The vehicle as claimed in claim 17, wherein said tank is integrated into said rim.

19. The vehicle as claimed in claim 17, wherein said vehicle is a two-wheeled vehicle and said rim associated with said tank belongs to a front wheel.

20. The vehicle as claimed in claim 17, wherein said vehicle is a two-wheeled vehicle and said rim associated with said tank belongs to a rear wheel.

21. The vehicle as claimed in claim 17, wherein a ratio between the volume of said tank and the inner volume of said tyre is about 0.1 to about 0.4.

22. The vehicle as claimed in claim 21, wherein said ratio between the volume of said tank and the inner volume of said tyre is about 0.12 to about 0.3.

23. The vehicle as claimed in claim 17, wherein a ratio between said operating pressure of said tyre and said first pressure is about 0.1 to about 0.6 at a reference temperature.

24. The vehicle as claimed in claim 23, wherein the ratio between said operating pressure of said tyre and said first pressure is about 0.2 to about 0.4 at said reference temperature.

25. The vehicle as claimed in claim 17, wherein said pressure sensor is placed on said rim.

26. The vehicle as claimed in claim 17, wherein said pressure sensor is placed on said tyre.

27. The vehicle as claimed in claim 17, wherein a second pressure sensor is operatively associated with said tank to measure pressure of said fluid contained in said tank.

28. The vehicle as claimed in claim 27, wherein said second pressure sensor is operatively associated with said signal generator to generate an alarm signal when the pressure of the fluid contained in the tank is under a predetermined second threshold value.

29. The vehicle as claimed in claim 28, wherein said predetermined second threshold value is about 1.5 PE to about 2.5 PE.

30. The vehicle as claimed in claim 17, wherein said signal generator is operatively associated with a transmission system to transmit the alarm signals generated by said generator to the driver.

31. The vehicle as claimed in claim 17, wherein said valve is a solenoid valve.

32. The vehicle as claimed in claim 31, wherein said pressure sensor measuring the inner pressure of the tyre controls said communication between said tank and tyre by means of said valve.

33. The vehicle as claimed in claim 32, wherein said pressure sensor controls said communication by means of said signal generator.

34. The vehicle as claimed in claim 31, wherein said solenoid valve is operatively associated with said signal generator to bring said tyre into communication with said tank when inner pressure variation corresponds to a reduction and is higher than a predetermined value.

35. The vehicle as claimed in claim 17, wherein a temperature sensor is provided which is operatively associated with said wheel to measure the inner temperature of the tyre.

36. The vehicle as claimed in claim 35, wherein said temperature sensor is operatively associated with said calculation unit to calculate the pressure corresponding to a reference temperature for each inner pressure measured according to said predetermined frequency at an inner temperature of the tyre.

37. The vehicle as claimed in claim 35, wherein said temperature sensor is integrated with said pressure sensor.

38. The vehicle as claimed in claim 17, wherein said first threshold value is about 0.8 PE to about 0.95 PE.

39. The vehicle as claimed in claim 17, wherein said first pressure is about 8 bars to about 12 bars.

40. A wheel comprising:
- at least one rim with which a tank adapted to be filled with a fluid to a first pressure is operatively associated;
- a tyre mounted on said rim and inflated to an operating pressure, said operating pressure being lower than said first pressure;
- at least one valve adapted to regulate communication between said tank and tyre so as to bring said tank and tyre into mutual communication when the inner pressure of said tyre is lower than a predetermined first threshold value; and
- at least one pressure sensor to measure the inner pressure of said tyre with a predetermined frequency, said pressure sensor capable of being operatively associated with a calculation unit calculating a variation in said inner pressure in the time unit.

41. The wheel as claimed in claim 40, wherein said tank is integrated into said rim.

42. The wheel as claimed in claim 40, wherein a ratio between volume of said tank and inner volume of said tyre is about 0.1 to about 0.4.

43. The wheel as claimed in claim 42, wherein said ratio between the volume of said tank and the inner volume of said tyre is about 0.12 to about 0.3.

44. The wheel as claimed in claim 40, wherein a ratio between said operating pressure of said tyre and said first pressure is about 0.1 to about 0.6 at a reference temperature.

45. The wheel as claimed in claim 44, wherein the ratio between said operating pressure of said tyre and said first pressure is about 0.2 to about 0.4 at said reference temperature.

46. The wheel as claimed in claim 40, wherein said pressure sensor is placed on said rim.

47. The wheel as claimed in claim 40, wherein said pressure sensor is placed on said tyre.

48. The wheel as claimed in claim 40, wherein a second pressure sensor is operatively associated with said tank to measure pressure of said fluid contained in said tank.

49. The wheel as claimed in claim 48, wherein said second pressure sensor is capable of being operatively associated with a signal generator to generate an alarm signal when the pressure of the fluid contained in the tank is under a predetermined second threshold value.

50. The wheel as claimed in claim 49, wherein said predetermined second threshold value is about 1.5 PE to about 2.5 PE.

51. The wheel as claimed in claim 40, wherein said valve is a solenoid valve.

52. The wheel as claimed in claim 51, wherein said pressure sensor measuring the inner pressure of the tyre controls said communication between said tank and tyre by means of said valve.

53. The wheel as claimed in claim 40, wherein a temperature sensor is provided to measure the inner temperature of the tyre.

54. The wheel as claimed in claim 53, wherein said temperature sensor is integrated with said pressure sensor.

55. The wheel as claimed in claim 40, wherein said first threshold value is about 0.8 PE to about 0.95 PE.

56. The wheel as claimed in claim 40, wherein said first pressure is about 8 bars to about 12 bars.

* * * * *